United States Patent
Gubbi Lakshminarasimha et al.

(10) Patent No.: US 12,260,618 B2
(45) Date of Patent: Mar. 25, 2025

(54) METHOD AND SYSTEM FOR FASHION ATTRIBUTE DETECTION

(71) Applicant: Tata Consultancy Services Limited, Mumbai (IN)

(72) Inventors: Jayavardhana Rama Gubbi Lakshminarasimha, Bangalore (IN); Gaurab Bhattacharya, Bangalore (IN); Nikhil Kilari, Bangalore (IN); Bagyalakshmi Vasudevan, Chennai (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 370 days.

(21) Appl. No.: 17/810,468

(22) Filed: Jul. 1, 2022

(65) Prior Publication Data

US 2023/0069442 A1  Mar. 2, 2023

(30) Foreign Application Priority Data

Jul. 15, 2021  (IN) .............................. 202121031998

(51) Int. Cl.
*G06V 10/82* (2022.01)
*G06V 10/77* (2022.01)
(Continued)

(52) U.S. Cl.
CPC ...... *G06V 10/7715* (2022.01); *G06V 10/7747* (2022.01); *G06V 10/776* (2022.01); *G06V 10/82* (2022.01)

(58) Field of Classification Search
CPC ........... G06V 10/7715; G06V 10/7747; G06V 10/776; G06V 10/82; G06N 3/045; G06N 3/0464; G06N 3/09
See application file for complete search history.

(56) References Cited

U.S. PATENT DOCUMENTS

| 11,080,918 B2 * | 8/2021 | Chen ........................ G06N 3/08 |
| 11,250,572 B2 * | 2/2022 | Sollami ................... G06T 7/174 |

(Continued)

FOREIGN PATENT DOCUMENTS

CN  110895702 B  1/2021

OTHER PUBLICATIONS

X. Yingheng and Z. Yueqi, "Multiple Attention Mechanism Neural Network in Garment Image Segmentation," 2020 International Conference on Computational Science and Computational Intelligence (CSCI), Las Vegas, NV, USA, 2020, pp. 1677-1683, doi: 10.1109/CSCI51800.2020.00309. (Year: 2020).*

(Continued)

*Primary Examiner* — Bobbak Safaipour
*Assistant Examiner* — Dylan Joseph Sherrillo
(74) *Attorney, Agent, or Firm* — Finnegan, Henderson, Farabow, Garrett & Dunner, LLP

(57) ABSTRACT

Traditional systems used for fashion attribute detection struggle to generate accurate predictions due to presence of large intra-class and relatively small inter-class variations in data related to the fashion attributes. The disclosure herein generally relates to image processing, and, more particularly, to a method and system for fashion attribute detection. The method proposes F-AttNet, an attribute extraction network to leverage the performance of fine-grained localized fashion attribute recognition. F-AttNet comprises Attentive Multi-scale Feature Encoder (AMF) blocks that encapsulate multi-scale fine-grained attribute information upon adaptive recalibration of channel weights. F-AttNet is designed by hierarchically stacking the AMF encoders to extract deep fine-grained information across multiple scales. A data model used by F-AttNet is trained using a novel γ-variant focal loss function for addressing the class imbalance problem by penalizing wrongly classified examples and incor- (Continued)

porating separate importance to positive and negative instances.

9 Claims, 12 Drawing Sheets

(51) Int. Cl.
  *G06V 10/774* (2022.01)
  *G06V 10/776* (2022.01)

(56) References Cited

U.S. PATENT DOCUMENTS

| | | | | |
|---|---|---|---|---|
| 11,475,500 | B2* | 10/2022 | Ning | G06V 10/82 |
| 11,901,076 | B1* | 2/2024 | Daughton | G06N 3/0455 |
| 2021/0133479 | A1* | 5/2021 | Ma | G06N 3/045 |
| 2021/0173395 | A1* | 6/2021 | Das | G06V 10/776 |
| 2022/0092366 | A1* | 3/2022 | Chiu | G06N 20/00 |

OTHER PUBLICATIONS

O. Stephen, U. J. Maduh, S. Ibrokhimov, K. L. Hui, A. Abdulhakim Al-Absi and M. Sain, "A Multiple-Loss Dual-Output Convolutional Neural Network for Fashion Class Classification," 2019 21st International Conference on Advanced Communication Technology (ICACT), PyeongChang, Korea (South), 2019 (Year: 2019).*

Y. Xia, B. Chen, W. Lu, F. Coenen and B. Zhang, "Attributes-oriented clothing description and retrieval with multi-task convolutional neural network," 2017 13th International Conference on Natural Computation, Fuzzy Systems and Knowledge Discovery (ICNC-FSKD), Guilin, China, 2017 (Year: 2017).*

X. Yingheng and Z. Yueqi, "Multiple Attention Mechanism Neural Network in Garment Image Segmentation," 2020 International Conference on Computational Science and Computational Intelligence (CSCI), Las Vegas, NV, USA, 2020, pp. 1677-1683, doi: 10.1109/CSCI51800.2020.00309. (Year: 2020) (Year: 2020).*

J. Dong et al., "Fine-Grained Fashion Similarity Prediction by Attribute-Specific Embedding Learning," in IEEE Transactions on Image Processing, vol. 30, pp. 8410-8425, 2021, doi: 10.1109/TIP. 2021.3115658. (Year: 2021).*

Viral Parekh et al. "Fine-Grained Visual Attribute Extraction from Fashion Wear," IEEE/CVF Conference on Computer Vision and Pattern Recognition Workshops (CVPRW), 2021, IEEE https://openaccess.thecvf.com/content/CVPR2021W/CVFAD/papers/Parekh_Fine-Grained_Visual_Attribute_Extraction_From_Fashion_Wear_CVPRW_2021_paper.pdf.

Nikolaos Sarafianos et al., "Deep Imbalanced Attribute Classification using Visual Attention Aggregation," Computer Vision and Pattern Recognition, Jul. 2018, Arxiv, https://arxiv.org/pdf/1807.03903.pdf.

Sanyi Zhang et al., "Task-aware Attention Model for Clothing Attribute Prediction," IEEE Transactions on Circuits and Systems for Video Technology, 2019, vol. 30, Issue: 4, pp. 1051-1064, IEEE, https://www.researchgate.net/publication/331422322_Task-Aware_Attention_Model_for_Clothing_Attribute_Prediction/link/6014d5b6299bf1b33e351427/download.

Menglin Jia et al., "A Deep-Learning-Based Fashion Attributes Detection Model," Computer Vision and Pattern Recognition, 2018, Arxiv, https://arxiv.org/ftp/arxiv/papers/1810/1810.10148.pdf.

* cited by examiner

METHOD AND SYSTEM FOR FASHION ATTRIBUTE DETECTION

PRIORITY CLAIM

This U.S. patent application claims priority under 35 U.S.C. § 119 to: Indian provisional Patent Application No. 202121031998, filed on Jul. 15, 2021. The entire contents of the aforementioned application are incorporated herein by reference.

TECHNICAL FIELD

The disclosure herein generally relates to image processing, and, more particularly, to a method and system for fashion attribute detection.

BACKGROUND

Understanding product attributes is critical in achieving automation in product tagging for large merchandise and retail companies. Attribute classification hence constitutes the elementary onset for various image processing applications on retail images, such as product recommendation, product retrieval, product parsing and so on. Traditionally, fashion attribute classification has been performed using manual effort. However, multiple shortcomings of this aspect make the manual tagging a non-optimum solution for industrial applications. Firstly, the tiresome job of handling a massive number of categories and the manual intervention makes the entire operation of product attribute tagging error-prone and tedious. Secondly, human bias and lack of domain knowledge influence the accuracy with which the tagging and classification are performed. Finally, these problems resonate in wrongful tagging of products which impedes consumer experience and satisfaction.

Convolutional Neural Networks (CNNs) have shown remarkable progress in visual information extraction which is very relevant to multiple retail use-cases. Attribute classification problem for retail use-case constitutes a unique challenge that sets it apart from traditional large-scale image classification problem. Firstly, the attribute classification is a multi-label multi-class classification problem where each example constitutes many instances of classes present, making it challenging for a conventional deep feature extractor block to aggregate discriminatory information. Secondly, unlike single-label classification, fashion attributes usually contain high variations in appearance (such as variations in pattern size), scale and aspect ratio (such as size variations for same features). Thirdly, different attributes from same super-class usually capture strong visual similarity, whereas same attributes can possess visually dissimilar examples, resulting in large intra-class and relatively small inter-class variations. Finally, the random presence of instances per class incorporates sparsity for every instance, resulting in class-imbalance to exacerbate the classification performance. Hence, automation of attribute tagging is a necessity to obtain better classification performance with a faster response without involving domain experts for inference. Attribute recognition from retail products is a fundamental application for retail-use cases. Multiple inter-dependent modules for retail-based solutions such as automatic attribute tagging, attributes for recommendation, attribute recognition for personalized product search, attribute search for in-shop retrieval, attribute manipulation for flexible fashion search and so on depend on attribute recognition problem.

SUMMARY

Embodiments of the present disclosure present technological improvements as solutions to one or more of the above-mentioned technical problems recognized by the inventors in conventional systems. For example, in one embodiment, a processor implemented method of fashion feature extraction is provided. In this method, initially at least one image is collected as input, via one or more hardware processors. Further, the at least one image is processed using a feature extraction network comprising a plurality of Attentive Multi-scale Feature (AMF) blocks implemented the via one or more hardware processors, using a data model. Processing the image by the plurality of AMF blocks involves the following steps. Initially, a plurality of features are extracted from the image, by a first subnetwork of the AMF blocks. Further, features belonging to different scales are identified and extracted from among the plurality of features extracted from the image, by a second subnetwork of the AMF blocks, wherein the second subnetwork applies a convolution operation on the plurality of features. Further, a unique weightage is assigned to each of a plurality of channels used for the convolution operation, based on an automatically determined importance of each of the features belonging to the different scales, by a third subnetwork of the AMF blocks. Further, a rank for each of the extracted features belonging to the different scales is determined, based on the unique weightage of corresponding channel, by the third subnetwork. Further, one or more recommendations of the extracted features are generated based on the determined rank of each of the extracted features.

In another aspect, a system for fashion feature extraction is provided. The system includes one or more hardware processors, a communication interface, and a memory storing a plurality of instructions. The plurality of instructions cause the one or more hardware processors to perform the fashion feature extraction by executing the following steps. Initially at least one image is collected as input. Further, the at least one image is processed using a feature extraction network comprising a plurality of Attentive Multi-scale Feature (AMF) blocks implemented the via one or more hardware processors, using a data model. Processing the image by the plurality of AMF blocks involves the following steps. Initially, a plurality of features are extracted from the image, by a first subnetwork of the AMF blocks. Further, features belonging to different scales are identified and extracted from among the plurality of features extracted from the image, by a second subnetwork of the AMF blocks, wherein the second subnetwork applies a convolution operation on the plurality of features. Further, a unique weightage is assigned to each of a plurality of channels used for the convolution operation, based on an automatically determined importance of each of the features belonging to the different scales, by a third subnetwork of the AMF blocks. Further, a rank for each of the extracted features belonging to the different scales is determined, based on the unique weightage of corresponding channel, by the third subnetwork. Further, one or more recommendations of the extracted features are generated based on the determined rank of each of the extracted features.

In yet another aspect, a non-transitory computer readable medium for fashion feature extraction is provided. The non-transitory computer readable medium includes a plurality of instructions which when executed, cause execution of the following steps to perform the fashion feature extraction. Initially at least one image is collected as input, via one or more hardware processors. Further, the at least one image is processed using a feature extraction network comprising a plurality of Attentive Multi-scale Feature (AMF) blocks implemented the via one or more hardware processors, using a data model. Processing the image by the plurality of AMF blocks involves the following steps. Initially, a plurality of features are extracted from the image, by a first subnetwork of the AMF blocks. Further, features belonging to different scales are identified and extracted from among the plurality of features extracted from the image, by a second subnetwork of the AMF blocks, wherein the second subnetwork applies a convolution operation on the plurality of features. Further, a unique weightage is assigned to each of a plurality of channels used for the convolution operation, based on an automatically determined importance of each of the features belonging to the different scales, by a third subnetwork of the AMF blocks. Further, a rank for each of the extracted features belonging to the different scales is determined, based on the unique weightage of corresponding channel, by the third subnetwork. Further, one or more recommendations of the extracted features are generated based on the determined rank of each of the extracted features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
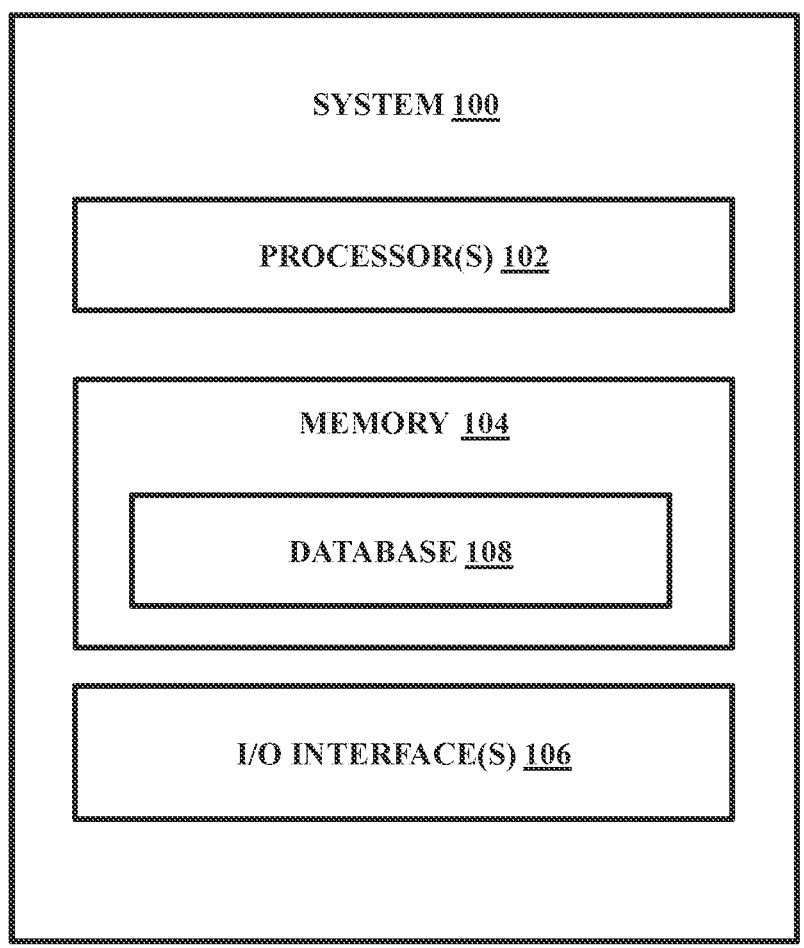
FIG. 1 illustrates an exemplary block diagram of a system for fashion attribute detection, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for fashion attribute detection. The method implements F-AttNet, an attribute extraction network to leverage the performance of fine-grained localized fashion attribute recognition. F-AttNet comprises Attentive Multi-scale Feature (AMF) Encoder blocks that encapsulate multi-scale fine-grained attribute information upon adaptive recalibration of channel weights. F-AttNet is designed by hierarchically stacking the AMF encoders to extract deep fine-grained information across multiple scales. A data model used by F-AttNet is trained using a novel γ-variant focal loss function for addressing the class imbalance problem by penalizing wrongly classified examples and incorporating separate importance to positive and negative instances. F-AttNet addresses the issues for recognition of attributes from retail products, namely multi-label classification, large instance variation, visually similar attributes and class-imbalance, prevalent in retail attribute applications. The disclosed attribute extraction network F-AttNet can be used in any retail application such as but not limited to automatic attribute tagging, recommendation systems, personalized product search and retrieval systems, and anomaly detection.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

FIG. 1 illustrates an exemplary block diagram of a system for fashion attribute detection, in accordance with some embodiments of the present disclosure. In an embodiment, the system 100 includes a processor(s) 102, communication interface device(s), alternatively referred as input/output (I/O) interface(s) 106, and one or more data storage devices or a memory 104 operatively coupled to the processor(s) 102. The system 100 with one or more hardware processors is configured to execute functions of one or more functional blocks of the system 100.

Referring to the components of system 100, in an embodiment, the processor(s) 102, can be one or more hardware processors 102. In an embodiment, the one or more hardware processors 102 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 are configured to fetch and execute computer-readable instructions stored in the memory 104. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 104 includes a database 108 that stores all data associated with the fashion attribute detection being performed by the system 100. For example, the database 108 stores the configurable instructions that are executed to cause the one or more hardware processors 102 to perform various steps associated with the fashion attribute detection. The database 108 may further store all data, i.e. the one or more images that are collected as input for determining the fashion attribute detection. The database 108 may further store information on the detected fashion attributes and all the intermediate data generated. Functions of the components of the system 100 are explained in conjunction with the flow diagrams in FIG. 2 through FIG. 4.

Figure 2:
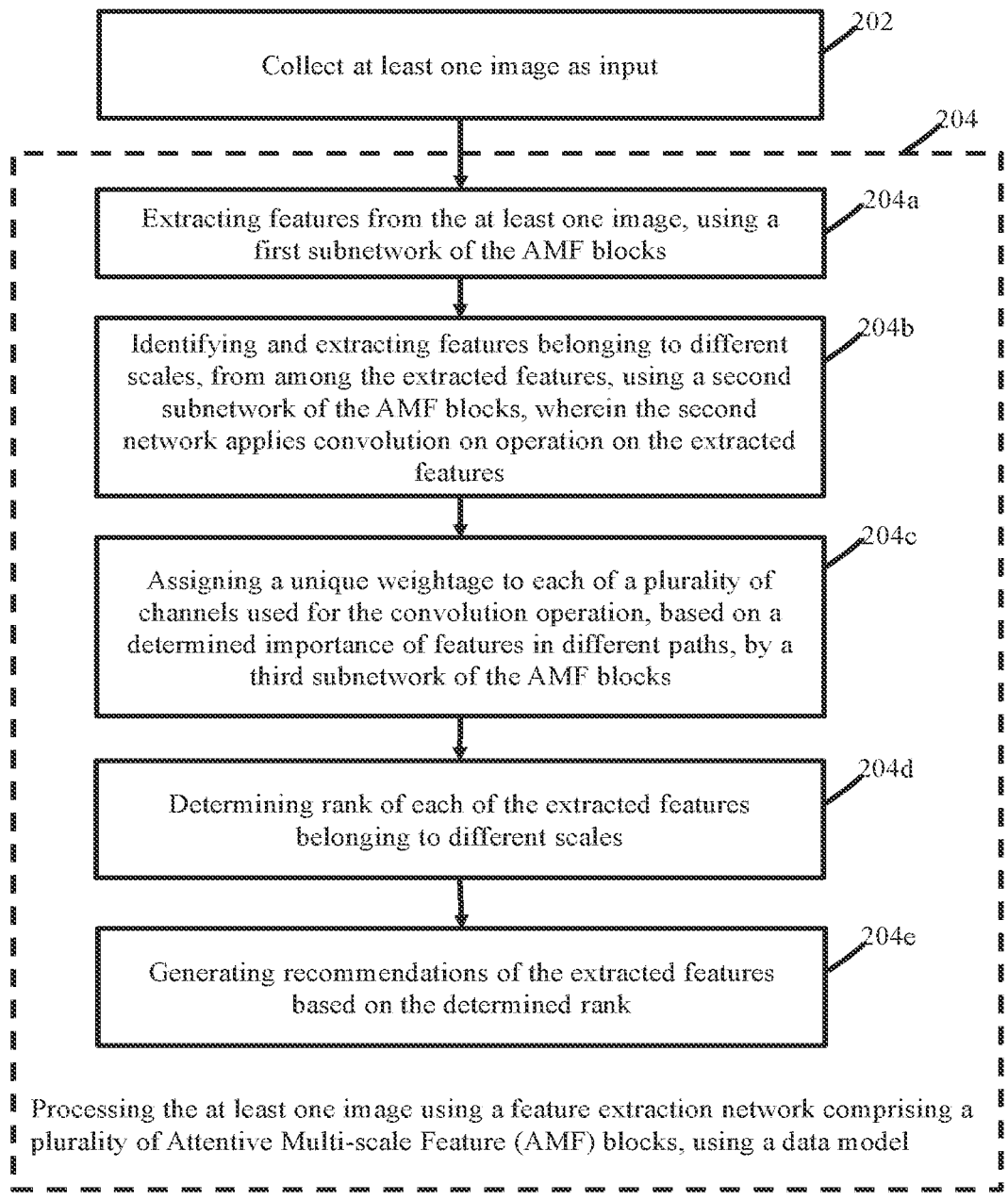
FIG. 2 is an exemplary flow diagram for a method for fashion attribute detection, using the system of FIG. 1, according to some embodiments of the present disclosure.
Figure 3:
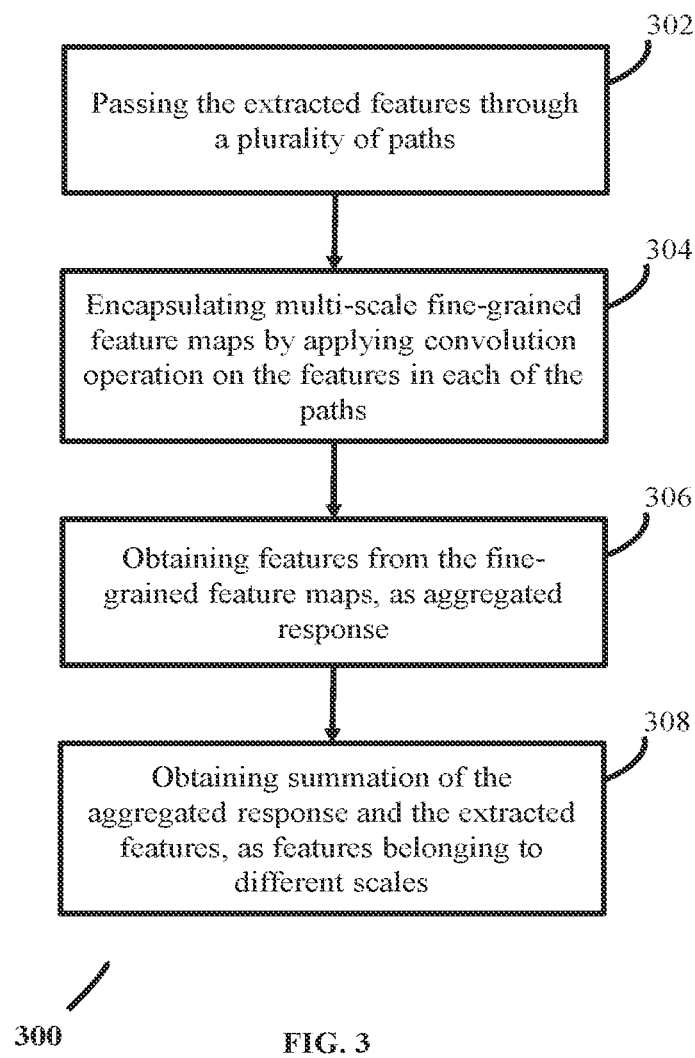
FIG. 3 is an exemplary flow diagram for a method for obtaining features belonging to different scales, using the system of FIG. 1, according to some embodiments of the present disclosure.
Figure 4:
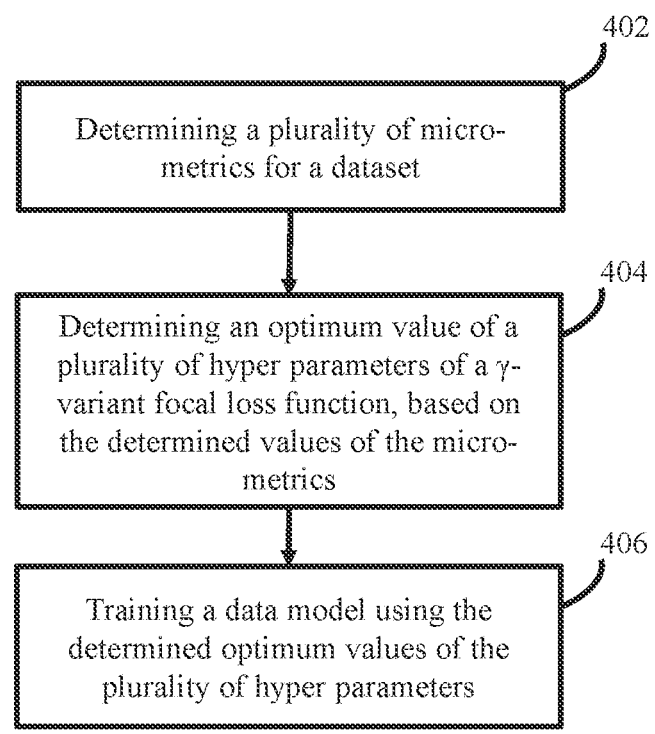
FIG. 4 is an exemplary flow diagram for a method for training a data model using a γ-variant focal loss function, using the system of FIG. 1, according to some embodiments of the present disclosure.
Figure 5:
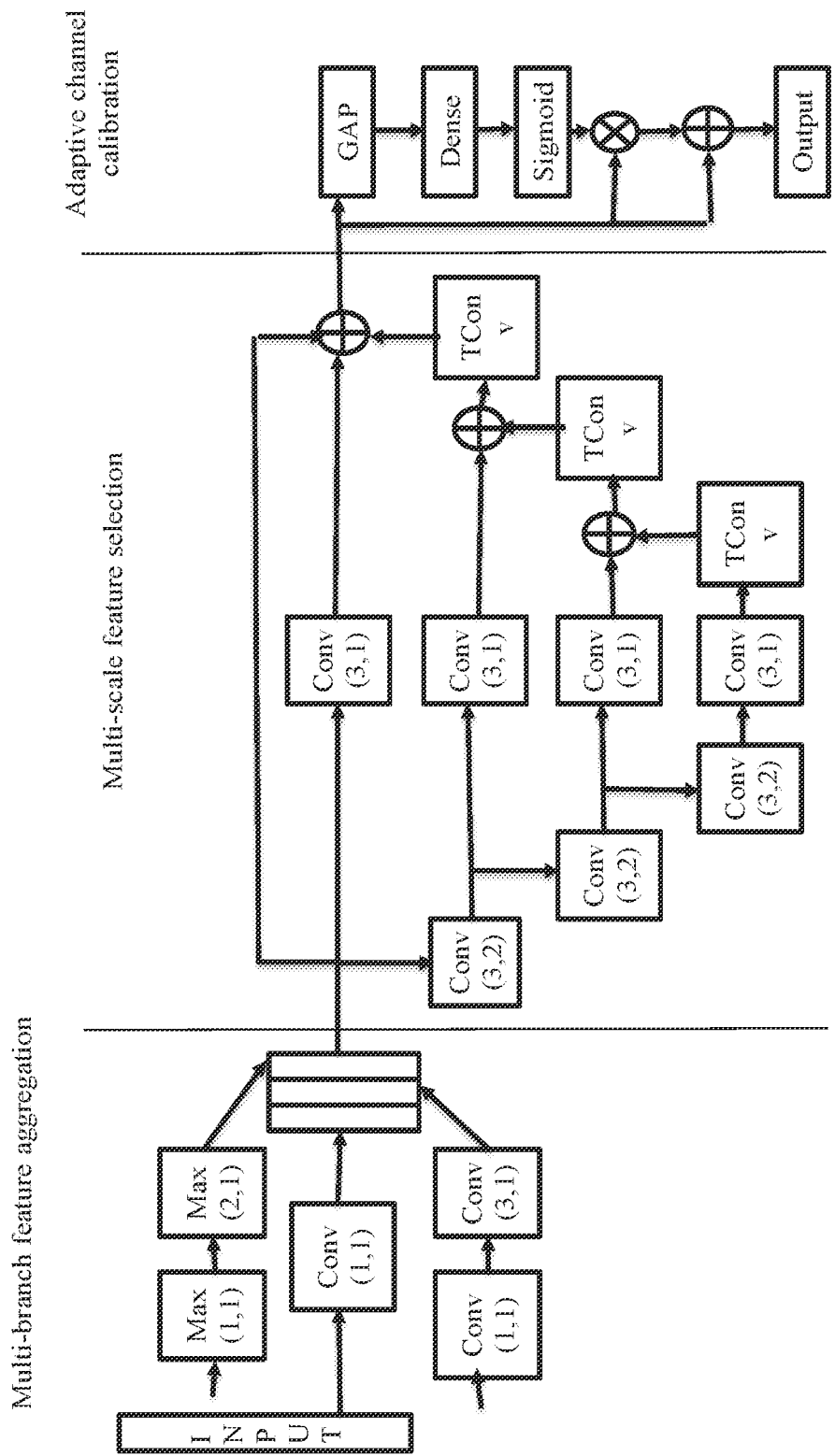
FIG. 5 is an exemplary block diagram of Attentive Multi-scale Feature encoder block of attribute extraction network for fashion attribute detection according to some embodiments of the present disclosure.

In an embodiment, for performing the fashion attribute detection, the system 100 is implemented as a F-AttNet, an attribute extraction network to leverage the performance of fine-grained localized fashion attribute recognition. In another embodiment, the system 100 may use the F-AttNet for the fashion attribute detection. The F-AttNet includes a plurality of Attentive Multi-scale Feature Encoder (AMF) blocks that encapsulate multi-scale fine-grained attribute information upon adaptive recalibration of channel weights. F-AttNet is designed by hierarchically stacking the AMF encoders to extract deep fine-grained information across multiple scales. A data model used by F-AttNet is trained using a novel γ-variant focal loss function for addressing the class imbalance problem by penalizing wrongly classified examples and incorporating separate importance to positive and negative instances. F-AttNet addresses the issues for recognition of attributes from retail products, namely multi-label classification, large instance variation, visually similar attributes and class-imbalance, prevalent in retail attribute applications. The disclosed attribute extraction network F-AttNet can be used in any retail application such as but not limited to automatic attribute tagging, recommendation systems, personalized product search and retrieval systems, and anomaly detection. Architecture of the F-AttNet is depicted in FIG. 5, and the different steps involved in the process of detecting the fashion are depicted in FIG. 2 through FIG. 4. The steps in FIG. 2 through FIG. 4 are explained with reference to components of the F-AttNet depicted in FIG. 5.

At step 202 of the method 200, the system 100 is configured to receive a retail fashion product image (alternately referred to as image) for fashion attribute detection as input. In an embodiment, the system 100 collects and processes multiple images to perform the fashion attribute detection. For explanation purpose, the fashion attribute prediction is explained by considering one image as input. Further, at step 204, the system 100 processes the image using the attribute extraction network, which in turn uses a data model that is trained using a γ-variant focal loss function. The γ-variant focal loss function is used as the loss function in the disclosed method for training the data model and in turn the attribute extraction network. The γ-variant focal loss function performs three operations at a time. Firstly, it provides more penalty to the wrongly classified instances and reduces the penalty for correctly classified ones, making the loss more sensitive to false prediction. Secondly, the γ-variant focal loss function provides relative weights to positive and negative examples, thereby focusing more on minority positive instances. Thirdly, the loss is generalized by providing an exponential treatment to encapsulate complex visual applications. The γ-variant focal loss function is provided as the equation 1 given below, $$L(y_t, y_p) = \frac{1}{C}\Sigma_{i=1}^{C}[-y_t(i)[(1 - y_p(i)^{\gamma_1})\log(y_p(i))]^n - \lambda(1 - y_t(i))[(y_p(i)^{\gamma_2})\log(1 - y_p(i))]^n] \quad (1)$$

Here, $y_t$ and $y_p$ denote the ground-truth labels and predicted labels, respectively. Two separate γ values are used by the γ-variant focal loss function to separately optimize the attribute extraction network by reducing all the false instances depending on their probability of occurrence for true and false instances. The hyper-parameters $\gamma_1$ and $\gamma_2$ enable the γ-variant focal loss function to adaptively focus on false positive and false negative hard examples by increasing the corresponding cost in the loss function. The hyper-parameter λ deals with providing different weights to the positive and negative instances which is an aspect of the class imbalance problem. The use of λ enables the network to obtain the best possible relative weight to meet the trade-off between majority and minority instances. The hyper-parameter n provides an exponential treatment to the losses, making the loss more adaptive towards the need of the database and the network.

Various steps involved in processing the image using the attribute extraction network are depicted in steps 204a through 204e. At a broad level, the fashion attribute detection being performed by the F-AttNet involves three steps i.e. a) multi-branch feature aggregation, b) multi-scale feature selection, and c) adaptive channel calibration. For explanation purpose, part of the F-AttNet that handles the multi-branch feature aggregation is called first sub-network, part of the F-AttNet that handles the multi-scale feature selection is called second sub-network, and part of the F-AttNet that handles the adaptive channel calibration is called third sub-network.

At step 204a of the method 200, the system 100 is configured to extract a plurality of features from the image using a convolution layer in the first sub-network of the attribute extraction network. In an embodiment, the features extracted from the image are coarse features. The first sub-network comprises the convolution layer which extracts the plurality of coarse features from the received retail fashion product image using 32 filters of kernel size (3,3) and stride 2.

The first sub-network enables the extraction of the coarse features in a parallel manner to aggregate different representations from the low-level features for further fine-grained image analysis. Three filtering operations (in three paths/branches as depicted in FIG. 5) are used for extracting the information which are specified below, $$I(H,W,C) \to \text{Conv}(C,1) \to \text{Max}(2,1) \to P_1$$

$$I(H,W,C) \to \text{Conv}(C,1) \to P_2$$

$$I(H,W,C) \to \text{Conv}(C,1) \to \text{Conv}(C,3) \to P_3 \quad (2)$$

Here, I(H,W,C) denotes an input tensor with (H,W) as the spatial extent and C as the number of channels. In equation 2, Conv(A,B) represents convolution operation followed by an activation function. For example, the activation function is a ReLU activation using kernel size=(B,B); stride=1 and filter$_{num}$=A. Other appropriate activation functions may be used by the system 100. It is to be noted that mention of ReLU activation in FIG. 5 and in the description provided herein is not intended to limit the scope of embodiments to ReLU activation. By this operation, the attribute extraction network gets multiple feature representations owing to variations in the kernel size and pooling operations, further enabling it to incorporate holistic response extraction to represent minute details present in the retail fashion images. The response of three branches is finally concatenated, resulting a multi-path feature aggregation response Out given by Out=Concatenate($P_1,P_2,P_3$). The encapsulation of multi-path features thus not only helps to capture variations in attribute instances, but also helps to represent features required for multi-label feature extraction and classification.

Further, at step 204b, the system 100 identifies and extracts features belonging to different scales, from among the extracted features at step 204a, using the second sub-network. Various steps involved in the process of determining the features belonging to the different scales are depicted in FIG. 3. The multi-scale feature selection by the second sub-network is used for generating a fine-grained feature map across multiple scales and their aggregated response empowers the attribute extraction network to distinguish between visually similar attributes in a multi-label classification scenario. The second sub-network consolidates features across multiple scales (for example, ranging from 128×128 to 8×8) to obtain locally recognizable fine-grained cues for discrimination of similar-looking attributes. For this purpose, the second sub-network passes the extracted features through a plurality of paths, at step 302. At this step, the input to the second sub-network undergoes n-stride convolution operations (wherein value of 'n' is configurable). For example, the input to the second sub-network is subject to a 3-stride convolution, as in FIG. 5, which gives tensors $T_i$, i∈[1,4], where $T_i$ is the input tensor to the second sub-network, as shown in equation 3. Here, at each step, the tensor is downscaled by a factor of 2.

$$T_i \to \text{Conv}(Ch,3) \to T_{i+1} \forall i \in [1,3] \quad (3)$$

where, Ch denotes the number of channels in tensor $T_i$, stride is 2.

The parallel multi-scale paths undergo convolution operation followed by the Rectified Linear Unit (ReLU) activation to encapsulate multi-scale fine-grained localized feature maps $C_i$, i∈[1,4] for mid-level representation for which the stride considered is 1, at step 304. The equation is given below, $$T_i \to \text{Conv}(Ch,3) \to C_i \forall i \in [1,4] \quad (4)$$

A bottom-up approach is used for aggregating the multi-scale information by up-sampling the lower-dimensional tensor with transposed convolution operation and adding it with the higher-dimensional tensor to get an aggregated response, at step 306. This operation captures the finetuned features from multiple scales to overlay highlighted attribute regions and is shown in equation 5 below, $$C_{i+1} \to T\text{-Conv}(Ch,3) \to C_{s_{i+1}},$$

$$C_i = C_i + C_{s_{i+1}}, i \in \{3,2,1\} \quad (5)$$

where, T−Conv(Ch,3) denotes transposed convolution operation with stride=2, kernel size=(3×3) and Ch channels. The output of this sub-network, given as in equation 6, is the addition of the final aggregated response (i.e., $C_1$) and the input to this subnetwork (i.e., $T_1$) connected through an identity connection, and is obtained at step 308.

$$\text{Out}=T_1+C_1 \quad (6)$$

Further, at step 204c, the third sub-network assigns a unique weightage to each of the channels (referred to as 'channel weight') used for applying the convolution operation on the features extracted at step 204b. The adaptive channel calibration done by the third sub-network separately investigates and determines the relative importance of fine-grained feature maps obtained from the second sub-network to consolidate important features by putting more focus on channels containing discriminatory spatial information required for attribute recognition. The global spatial information for every channel is embedded using global average pooling operation. Considering the input, I for this sub-network as a series of 2-D spatial planes [$I_1, I_2, I_3, \ldots, I_C$] where C is the number of channels; the channel embedding vector E can be given as shown in equation in 7.

$$E(k)=\Sigma_{i=1}^{H}\Sigma_{j=1}^{W} I_k(i,j) \forall k \in [1,C] \quad (7)$$

The embedding vector is then spatially excited for adaptively calibrating the channel weights, highlighting salient features. The spatial excitation is performed using a series of dense layers followed by a suitable activation function such as but not limited to sigmoid activation function. Between the dense layers, ReLU non-linearity is provided. Two dense layers with the number of nodes as (C/4) and C, respectively, is considered producing channel weight vector Ch.

$$E \to \text{Dense}(C/4) \to \text{ReLU act.} \to \text{Dense}(C) \to \text{sigmoid act.} \to Ch.$$

Channel attention operation is performed by multiplying each element of attention vector channel-wise to obtain the output map Out.

$$\text{Out}=(1+Ch)*I \quad (8)$$

The set of fine-grained features are extracted using two AMF encoder blocks followed by the max-pooling layers with kernel size (2,2) and stride 2. Multiple AMF encoder blocks are required for attribute extraction network for effective feature extraction.

The third sub-network then applies the determined channel weightages on the features from each of the channels, and thus determines a rank of each of the extracted features corresponding to the different scales. Channel weightage value being high for a channel indicates high possibility of the channel carrying features of high importance. Subsequently the rank of the features from the channels having high channel weightage are high. Further, at step 204e, one or more recommendations are generated by the system 100, during which the system 100 may recommend the features in decreasing order of rank. In an embodiment, number of features 'n' to be recommended may be configured with the system 100, and the system 100 may then recommend 'n' features having highest ranks from among the extracted features belonging to different scales. In another embodiment, all the extracted features belonging to different scales may be recommended in the decreasing order of rank. The system 100 is configured to detect and generate the recommendation of the set of fashion attributes corresponding to the image from the set of fine-grained features using a global average pooling layer and dense layers in the third subnetwork. The global average pooling is used to obtain the global attribute descriptor embedding which is connected to multiple dense layers. It is to be noted that in the example architecture depicted in FIG. 5, except the final dense layer which uses sigmoid activation function, rest are activated using ReLU activation. Dropout of 0.25 has been used in intermediate dense layers to prevent the network from overfitting.

FIG. 4 is an exemplary flow diagram for a method for training a data model using a γ-variant focal loss function, using the system of FIG. 1, according to some embodiments of the present disclosure. At step 402, the system 100 determines a plurality of micro-metrics to address the class-imbalance problem in a multi-label scenario, for a dataset to be used to train the data model. For example, the micro-metrics used are micro-precision, micro-recall, and micro-F1 scores. Further, at step 404, the system 100 determines an optimum value of a plurality of hyper parameters of a γ-variant focal loss function, based on the determined values of the micro-metrics. In an embodiment, the hyper parameters are $\gamma_1$, $\gamma_2$, $\lambda$ and n. Further at step 406, the system 100 uses the determined optimum values of the hyper parameters for training the data model. The training of the data model, as in method 400, is explained in detail in the experimental results section.

Experimental Results

During the experiments conducted, the F-AttNet architecture was evaluated using iMaterialist-2018 Fashion Attribute Database as training data. The iMaterialist-2018 database contains 228 fine-grained fashion attributes which constitute an exhaustive set of attributes for retail fashion understanding. The iMaterialist-2018 is a multi-label attribute recognition database with 228 attribute labels for each example. To address the class-imbalance problem prevalent in the data in a multi-label scenario, micro-precision, micro-recall and micro-F1 scores is used as performance metrics for the evaluation. The top-8 values from the final dense layer of the network are chosen, owing to represent eight super-categories for prediction; and obtain the micrometrics to obtain an overall measurement. The evaluation metrics micro-precision (μ–P), micro-recall (μ–R) and micro-F1 score (μ–F1) are computed using the equation 9 as given below, $$\mu-P = \frac{\Sigma_{i=1}^{C} TP_i}{\Sigma_{i=1}^{C}(TP_i + FP_i)} \quad (9)$$

-continued $$\mu-R = \frac{\Sigma_{i=1}^{C} TP_i}{\Sigma_{i=1}^{C}(TP_i + FN_i)}$$

$$\mu-F1 = \frac{2 \times \mu-P \times \mu-R}{\mu-P + \mu-R}$$

Here, C represents number of classes in iMaterialist-2018 database, (i.e., 228) and TP, FP and FN denote true positive, false positive and false negative, respectively.

Figure 6A:
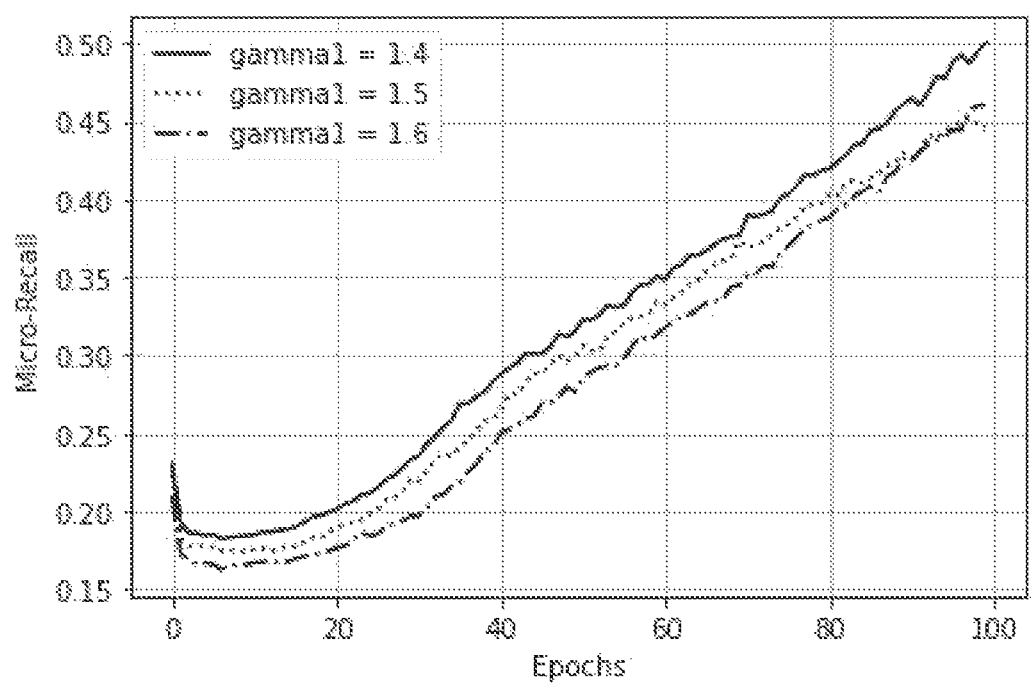
FIG. 6A illustrates first hyperparameter optimization for γ variant focal loss function for fashion attribute detection according to some embodiments of the present disclosure.
Figure 6B:
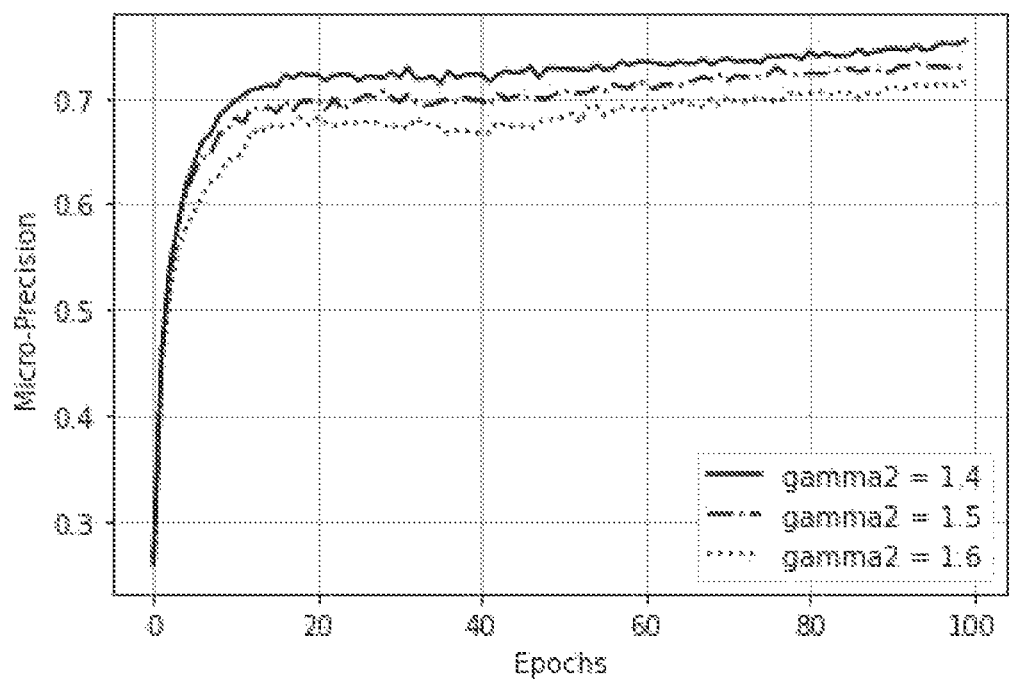
FIG. 6B illustrates second hyperparameter optimization for γ variant focal loss function for fashion attribute detection according to some embodiments of the present disclosure.

The γ-variant focal loss function used for training constitutes four hyperparameters $\gamma_1$, $\gamma_2$, $\lambda$ and n. To evaluate the attribute extraction network's ability to understand large-scale discriminatory features and to address the class imbalance problem using fewer image instances, 6000 images from iMaterialist-2018 database were considered that included 1000 images for testing and 1000 for validation. To understand the optimum value for the hyper-parameters for the requirement of fine-grained fashion attribute recognition, a grid search was conducted varying one of the hyper parameters and then fixing the rest at every iteration. The $\gamma_1$ values were varied by fixing $\gamma_2$, $\lambda$ and n to be 1.5, 0.8 and 2, respectively. Since $\gamma_1$ influences the positive class instances and thereby the false negative values; the $\gamma_1$ value is obtained with best recall (i.e., lowest false negative) in 100 epochs. The attribute extraction network was trained with a large range of $\gamma_1$ values. FIG. 6A illustrates the convergence curves for three $\gamma_1$ values which gave the highest recall metric. From the FIG. 6A, it is $\gamma_1$=1.4 which results in the best recall value giving least false-negative instances. The F-AttNet was trained to find the optimum value of $\gamma_2$, keeping $\gamma_1$, $\lambda$ and n fixed at 1.5, 0.8 and 2, respectively. The hyper-parameter $\gamma_2$ was associated with the negative examples, which in turn affected the false positive instances of the database. Hence, $\gamma_2$ value was obtained with the highest precision value for getting minimum false positive instances. Out of multiple values used for training, top-3 precision values for training are obtained using $\gamma_2$ as 1.4, 1.5 and 1.6, respectively which is shown in FIG. 6B. From FIG. 6B, it is clear that $\gamma_2$ value was selected as 1.4 for analysis of F-AttNet for iMaterialist-2018 database.

Figure 6C:
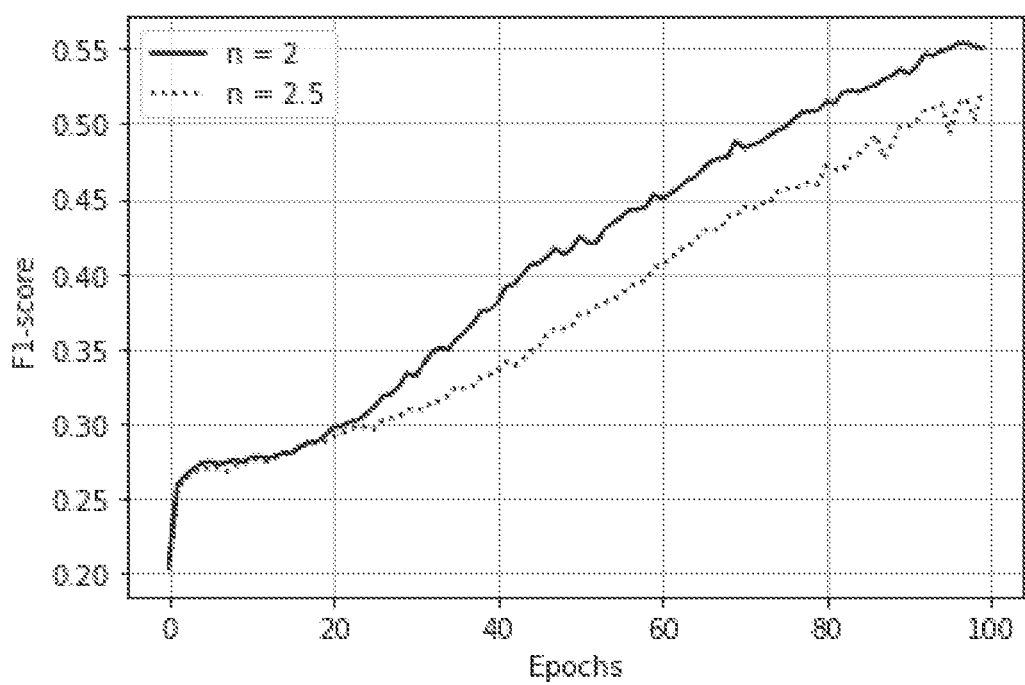
FIG. 6C illustrates third hyperparameter optimization for γ variant focal loss function for fashion attribute detection according to some embodiments of the present disclosure.
Figure 6D:
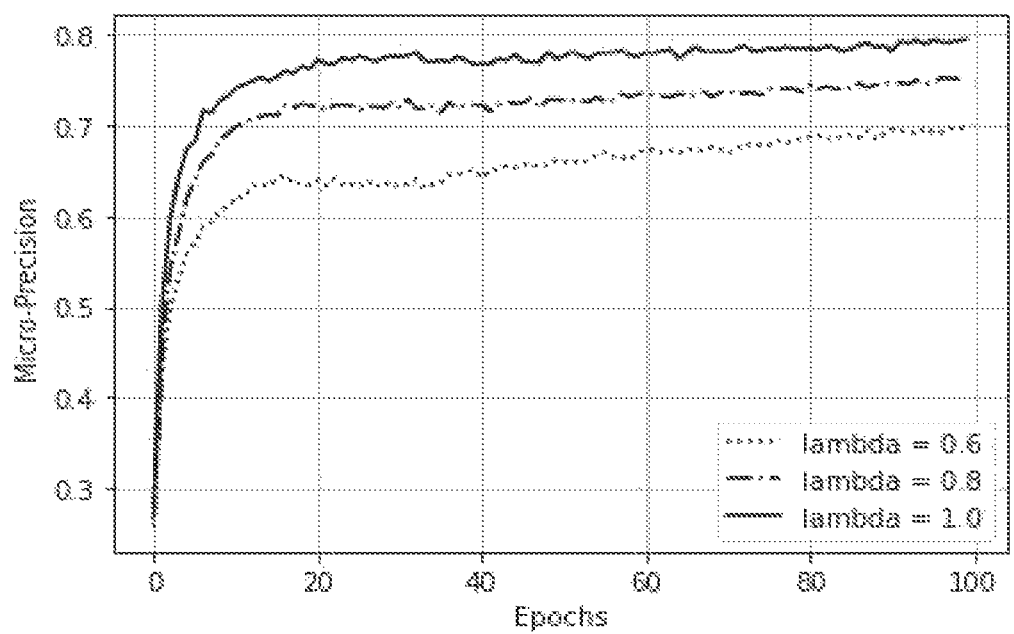
FIG. 6D illustrates fourth hyperparameter optimization for γ variant focal loss function for fashion attribute detection according to some embodiments of the present disclosure.

Furthermore, to analyze the best n value a similar set of experiments is performed considering $\gamma_1$, $\gamma_2$, $\lambda$ to be 1.5, 1.5 and 0.8 and varying n values. FIG. 6C shows the results for n=2 and 2.5. Since n influences both positive and negative instances, i.e., both precision and recall F1-score was considered for comparison. From the FIG. 6C, n=2 results in the best F1-score value. Finally, the best value of λ is chosen for constant values of $\gamma_1$, $\gamma_2$, n 1.5, 1.5 and 2, respectively. Since λ is associated with the negative examples, precision for evaluation is focused, which depends on false-positive instances. The λ value is chosen giving the best precision to reduce false positive instances. The curves for top-3 performances were depicted in FIG. 6D. λ value to be 1 was chosen which gave the best precision on the F-AttNet.

The F-AttNet is trained for 100 epochs using four different image sizes, i.e., 160, 192, 224 and 256 in a mini-batch size of 10. The loss function used for the training considered $\gamma_1$, $\gamma_2$, $\lambda$ and n to be 1.4, 1.4, 1 and 2, respectively. The experimental results of F-AttNet with the variation of image dimension are showed in Table 1 and Table 2, which shows that the network gives the best performance with image dimension (256×256×3).

TABLE 1

| Image Dimension | Training | | | Validation | | |
| --- | --- | --- | --- | --- | --- | --- |
| | Precision | Recall | F1-score | Precision | Recall | F1-score |
| (160 × 160 × 3) | 0.773 | 0.429 | 0.548 | 0.765 | 0.446 | 0.559 |
| (192 × 192 × 3) | 0.781 | 0.453 | 0.569 | 0.772 | 0.4451 | 0.560 |
| (224 × 224 × 3) | 0.765 | 0.423 | 0.541 | 0.541 | 0.789 | 0.421 |
| (256 × 256 × 3) | 0.804 | 0.557 | 0.654 | 0.654 | 0.801 | 0.594 |

TABLE 2

| Image Dimension | Testing | | |
| --- | --- | --- | --- |
| | Precision | Recall | F1-score |
| (160 × 160 × 3) | 0.739 | 0.415 | 0.532 |
| (192 × 192 × 3) | 0.763 | 0.492 | 0.598 |
| (224 × 224 × 3) | 0.729 | 0.548 | 0.626 |
| (256 × 256 × 3) | 0.756 | 0.587 | 0.661 |

Figure 7A:
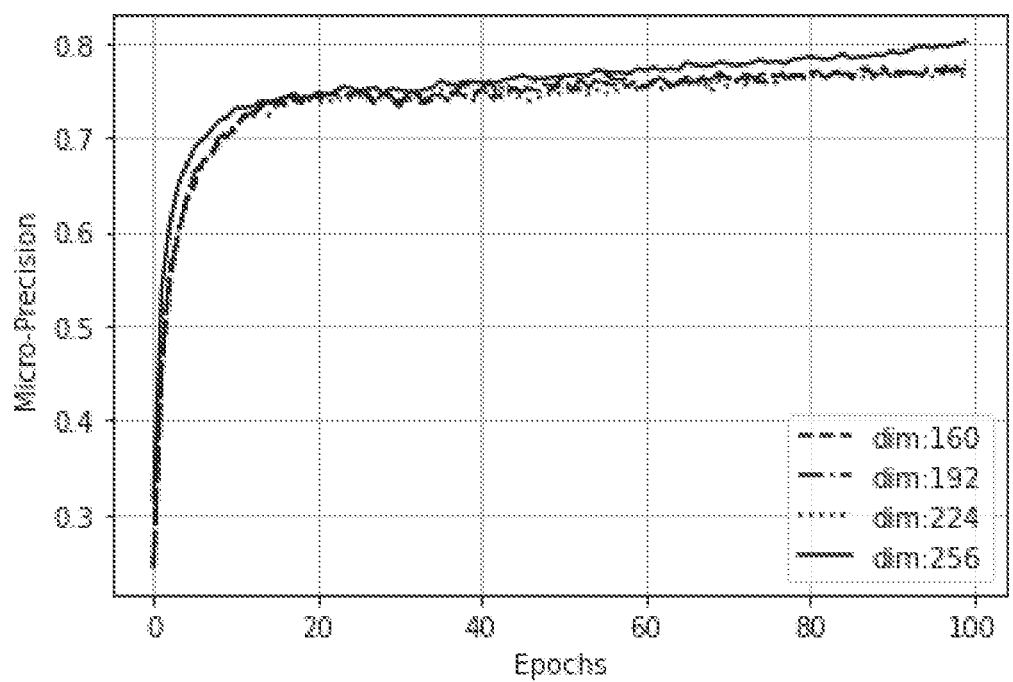
FIG. 7A illustrates a first example of convergence curves generated for precision, recall and F1-score for different dimensions, for training the data model for fashion attribute detection, according to some embodiments of the present disclosure.
Figure 7B:
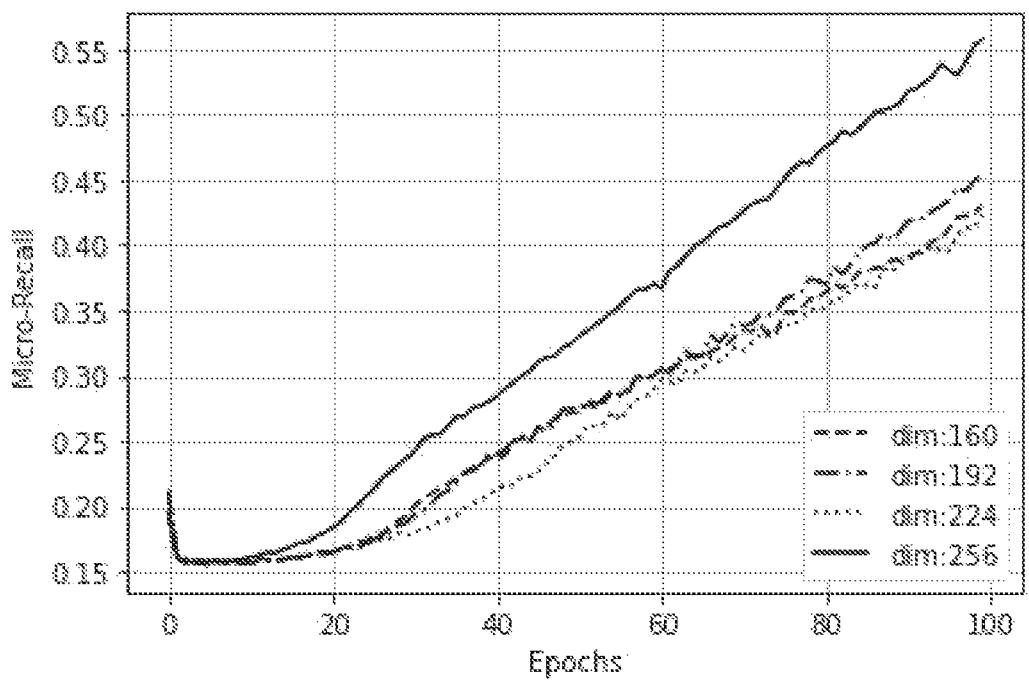
FIG. 7B illustrates a second example of convergence curves generated for precision, recall and F1-score for different dimensions, for training the data model for fashion attribute detection, according to some embodiments of the present disclosure.
Figure 7C:
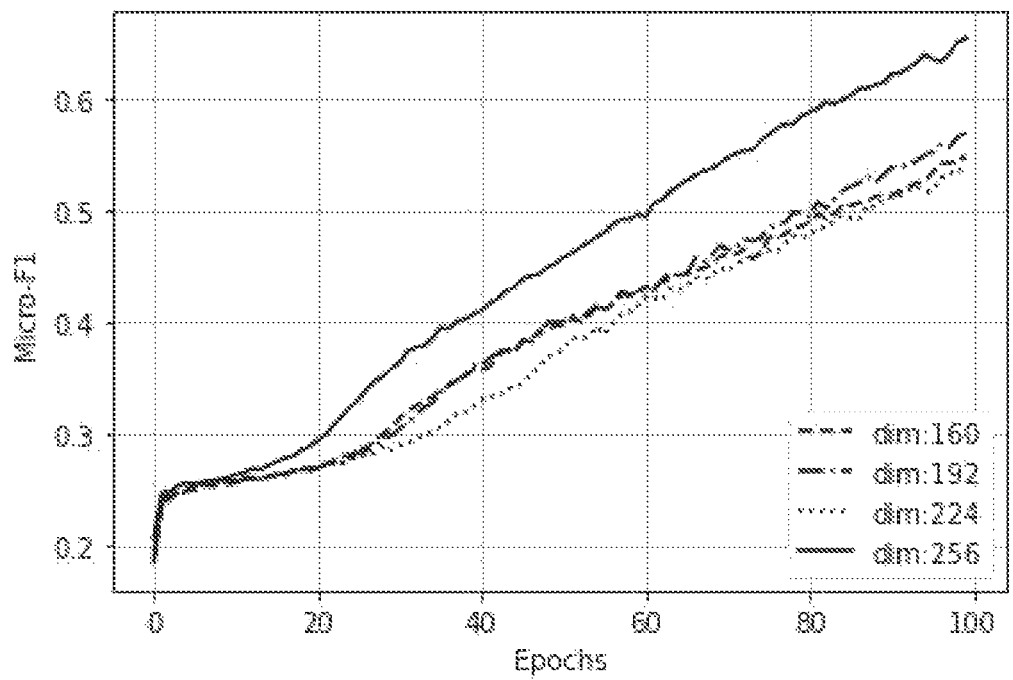
FIG. 7C illustrates a third example of convergence curves generated for precision, recall and F1-score for different dimensions, for training the data model for fashion attribute detection, according to some embodiments of the present disclosure.

The convergence curves for micro-precision, micro-recall and micro-F1 score for all the four experiments done for four dimensions are shown in FIG. 7A, FIG. 7B and FIG. 7C.

Table 3 provides the comparison of the performance of F-AttNet trained after 500 epochs with image dimension (256×256×3) with the state-of-the-art baseline models such as Inception-BN, ImageNet-pretrained Inception (Inception BN*), Inception V1, Inception V3 and ResNet-101 with weighted binary cross-entropy loss function. The performance of the proposed F-AttNet was identified as significantly outperforming the existing results by exceeding the best performances in testing by 18.4%, 16.4% and 17.4% margin in precision, recall and F1-score, respectively.

TABLE 3

| Method | Validation | | | Testing | | |
| --- | --- | --- | --- | --- | --- | --- |
| | Prec. | Rec. | F1 | Prec. | Rec. | F1 |
| Inception-BN | 0.594 | 0.596 | 0.595 | 0.590 | 0.596 | 0.593 |
| Inception-BN* | 0.600 | 0.602 | 0.601 | 0.596 | 0.602 | 0.599 |
| Inception V1 | 0.599 | 0.601 | 0.600 | 0.595 | 0.601 | 0.598 |
| Inception V3 | 0.605 | 0.607 | 0.606 | 0.599 | 0.605 | 0.602 |
| ResNet-101 | 0.597 | 0.599 | 0.598 | 0.593 | 0.599 | 0.595 |
| F-AttNet | 0.851 | 0.759 | 0.802 | 0.783 | 0.769 | 0.776 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of fashion attribute prediction by image processing. The embodiment, thus provides a method and system for fashion attribute prediction by processing one or more images. Moreover, the embodiments herein further provide F-AttNet, an attribute extraction network to leverage the performance of fine-grained localized fashion attribute recognition.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of fashion feature extraction, comprising:
collecting at least one image as input, via one or more hardware processors; and
processing the at least one image using a feature extraction network comprising a plurality of Attentive Multi-scale Feature (AMF) blocks implemented the via one or more hardware processors, using a data model, wherein processing the at least one image by the plurality of AMF blocks comprising:
extracting a plurality of features from the at least one image, by a first subnetwork of the AMF blocks, wherein the first subnetwork enables extraction of coarse features in parallel manner to aggregate different representations from low-level features for fine-grained image analysis;
identifying and extracting features belonging to different scales, from among the plurality of features extracted from the at least one image, by a second subnetwork of the AMF blocks, wherein the second subnetwork applies a convolution operation on the plurality of features, wherein extracting the plurality of features from the at least one image comprises concatenating a plurality of feature representations obtained from the at least one image by applying the convolution operation on the at least one image;
assigning a unique weightage to each of a plurality of channels used for the convolution operation, based on a determined importance of each of the features belonging to the different scales, by a third subnetwork of the AMF blocks for adaptive channel calibration;
determining a rank for each of the extracted features belonging to the different scales, based on the unique weightage of corresponding channel, by the third subnetwork; and
generating one or more recommendations of the extracted features based on the determined rank of each of the extracted features; and
verifying accuracy of the generated one or more recommendations of the extracted features using a γ-variant focal loss function, wherein the γ-variant focal loss function is used to train a data model for attribute extraction for addressing class imbalance by penalizing wrongly classified examples and incorporating importance to positive and negative instances, wherein the γ-variant focal loss function is provided by:

$$L(y_t, y_p) = \frac{1}{C}\sum_{i=1}^{C}[-y_t(i)[(1 - y_p(i)^{\gamma_1})\log(y_p(i))]^n - \lambda(1 - y_t(i))[(y_p(i)^{\gamma_2})\log(1 - y_p(i))]^n]$$

wherein, $y_t$ and $y_p$ denote ground-truth labels and predicted labels, hyper-parameters $\gamma_1$ and $\gamma_2$ enable the γ-variant focal loss function to adaptively focus on false positive and false negative hard examples by increasing corresponding cost in the loss function, wherein λ deals with providing different weights to the positive and negative instances, wherein $\gamma_1$ and $\gamma_2$ are used by the γ-variant focal loss function to separately optimize the attribute extraction network by reducing all the false instances depending on their probability of occurrence for true and false instances.

2. The method of claim 1, wherein identifying and extracting features belonging to different scales by applying the convolution operation on the plurality of features comprises:
passing the features extracted from the at least one image through a plurality of paths;
encapsulating a plurality of multi scale fine-grained feature maps of the features in each of the plurality of paths, wherein a stride length in each path is adaptively varied, wherein the encapsulation of plurality of multi scale fine-grained feature maps helps to represent the features required for multi-label feature extraction and classification;
obtaining a plurality of fine-tuned features from the multi scale fine-grained feature maps, as an aggregated response to distinguish between visually similar attributes in a multi-label classification; and
obtaining a summation of the aggregated response and the features extracted from the at least one image as the features belonging to the different scales for discrimination of similar-looking attributes.

3. The method of claim 1, wherein the data model is trained to perform the feature attribute extraction, further comprising:
determining value of a plurality of micro-metrics for a dataset, wherein the plurality of micro-metrics comprises precision, recall, and F1 score;
determining an optimum value of each of a plurality of hyper parameters of a γ-variant focal loss function, based on the determined values of the plurality of micro-metrics; and
training a data model using the determined optimum value of the plurality of hyper parameters of the γ-variant focal loss function.

4. A system for fashion feature extraction, comprising:
one or more hardware processors;
a communication interface; and
a memory storing a plurality of instructions, wherein the plurality of instructions cause the one or more hardware processors to:
collect at least one image as input; and
process the at least one image using a feature extraction network comprising a plurality of Attentive Multi-scale Feature (AMF) blocks implemented the via one or more hardware processors, using a data model, wherein processing the at least one image by the plurality of AMF blocks comprising:
extracting a plurality of features from the at least one image, by a first subnetwork of the AMF blocks, wherein the first subnetwork enables extraction of coarse features in parallel manner to aggregate different representations from low-level features for fine-grained image analysis;
identifying and extracting features belonging to different scales, from among the plurality of features extracted from the at least one image, by a second subnetwork of the AMF blocks, wherein the second subnetwork applies a convolution operation on the plurality of features, wherein extracting the plurality of features from the at least one image comprises concatenating a plurality of feature representations obtained from the at least one image by applying the convolution operation on the at least one image;

assigning a unique weightage to each of a plurality of channels used for the convolution operation, based on a determined importance of each of the features belonging to the different scales, by a third subnetwork of the AMF blocks for adaptive channel calibration;

determining a rank for each of the extracted features belonging to the different scales, based on the unique weightage of corresponding channel, by the third subnetwork; and generating one or more recommendations of the extracted features based on the determined rank of each of the extracted features, and verifying accuracy of the generated one or more recommendations of the extracted features using a γ-variant focal loss function, wherein the γ-variant focal loss function is used to train a data model for attribute extraction for addressing class imbalance by penalizing wrongly classified examples and incorporating importance to positive and negative instances, wherein the γ-variant focal loss function is provided by:

$$L(y_t, y_p) = \frac{1}{C}\sum_{i=1}^{C} [-y_t(i)[(1 - y_p(i)^{\gamma_1})\log(y_p(i))]^n - \lambda(1 - y_t(i))[(y_p(i)^{\gamma_2})\log(1 - y_p(i))]^n]$$

wherein, $y_t$ and $y_p$ denote ground-truth labels and predicted labels, hyper-parameters, $\gamma_1$ and $\gamma_2$ enable the γ-variant focal loss function to adaptively focus on false positive and false negative hard examples by increasing corresponding cost in the loss function, wherein λ deals with providing different weights to the positive and negative instances, wherein $\gamma_1$ and $\gamma_2$ are used by the γ-variant focal loss function to separately optimize the attribute extraction network by reducing all the false instances depending on their probability of occurrence for true and false instances.

5. The system of claim 4, wherein the system identifies and extracts features belonging to different scales by applying the convolution operation on the plurality of features, by:

passing the features extracted from the at least one image through a plurality of paths;

encapsulating a plurality of multi scale fine-grained feature maps of the features in each of the plurality of paths, wherein a stride length in each path is adaptively varied, wherein the encapsulation of plurality of multi scale fine-grained feature maps helps to represent the features required for multi-label feature extraction and classification;

obtaining a plurality of fine-tuned features from the multi scale fine-grained feature maps, as an aggregated response to distinguish between visually similar attributes in a multi-label classification; and obtaining a summation of the aggregated response and the features extracted from the at least one image as the features belonging to different scales for discrimination of similar-looking attributes.

6. The system of claim 4, wherein the system trains the data model to perform the feature attribute extraction, by:

determining value of a plurality of metrics for a dataset, wherein the plurality of micro-metrics comprises precision, recall, and F1 score;

determining an optimum value of each of a plurality of hyper parameters of a γ-variant focal loss function, based on the determined values of the plurality of micro-metrics; and training a data model using the determined optimum value of the plurality of hyper parameters of the γ-variant focal loss function.

7. One or more non-transitory machine-readable information storage mediums comprising one or more instructions which when executed by one or more hardware processors cause:

collecting at least one image as input, via one or more hardware processors;

processing the at least one image using a feature extraction network comprising a plurality of Attentive Multiscale Feature (AMF) blocks implemented the using a data model, wherein processing the at least one image by the plurality of AMF blocks comprising:

extracting a plurality of features from the at least one image, by a first subnetwork of the AMF blocks, wherein the first subnetwork enables extraction of coarse features in parallel manner to aggregate different representations from low-level features for fine-grained image analysis;

identifying and extracting features belonging to different scales, from among the plurality of features extracted from the at least one image, by a second subnetwork of the AMF blocks, wherein the second subnetwork applies a convolution operation on the plurality of features, wherein extracting the plurality of features from the at least one image comprises concatenating a plurality of feature representations obtained from the at least one image by applying the convolution operation on the at least one image;

assigning a unique weightage to each of a plurality of channels used for the convolution operation, based on a determined importance of each of the features belonging to the different scales, by a third subnetwork of the AMF blocks for adaptive channel calibration;

determining a rank for each of the extracted features belonging to the different scales, based on the unique weightage of corresponding channel, by the third subnetwork; and generating one or more recommendations of the extracted features based on the determined rank of each of the extracted features, and verifying accuracy of the generated one or more recommendations of the extracted features using a γ-variant focal loss function, wherein the γ-variant focal loss function is used to train a data model for attribute extraction for addressing class imbalance by penalizing wrongly classified examples and incorporating importance to positive and negative instances, wherein the γ-variant focal loss function is provided by:

$$L(y_t, y_p) = \frac{1}{C}\sum_{i=1}^{C} [-y_t(i)[(1 - y_p(i)^{\gamma_1})\log(y_p(i))]^n - \lambda(1 - y_t(i))[(y_p(i)^{\gamma_2})\log(1 - y_p(i))]^n]$$

wherein, $y_t$ and $y_p$ denote ground-truth labels and predicted labels, hyper-parameters $\gamma_1$ and $\gamma_2$ enable the γ-variant focal loss function to adaptively focus on false positive and false negative hard examples by increasing corresponding cost in the loss function, wherein λ deals with providing different weights to the positive and negative instances, wherein $\gamma_1$ and $\gamma_2$ are used by the γ-variant focal loss function to separately optimize the attribute extraction network by reducing all the false instances depending on their probability of occurrence for true and false instances.

8. The one or more non-transitory machine-readable information storage mediums of claim 7, wherein identifying and extracting features belonging to different scales by applying the convolution operation on the plurality of features comprises:
  passing the features extracted from the at least one image through a plurality of paths;
  encapsulating a plurality of multi scale fine-grained feature maps of the features in each of the plurality of paths, wherein a stride length in each path is adaptively varied, wherein the encapsulation of plurality of multi scale fine-grained feature maps helps to represent the features required for multi-label feature extraction and classification;
  obtaining a plurality of fine-tuned features from the multi scale fine-grained feature maps, as an aggregated response to distinguish between visually similar attributes in a multi-label classification; and
  obtaining a summation of the aggregated response and the features extracted from the at least one image as the features belonging to the different scales for discrimination of similar-looking attributes.

9. The one or more non-transitory machine-readable information storage mediums of claim 7, wherein the data model is trained to perform the feature attribute extraction, comprising:
  determining value of a plurality of micro-metrics for a dataset, wherein the plurality of micro-metrics comprises precision, recall, and F1 score;
  determining an optimum value of each of a plurality of hyper parameters of a γ-variant focal loss function, based on the determined values of the plurality of micro-metrics; and
  training a data model using the determined optimum value of the plurality of hyper parameters of the γ-variant focal loss function.

* * * * *